(12) United States Patent
Dickover et al.

(10) Patent No.: US 7,066,389 B2
(45) Date of Patent: Jun. 27, 2006

(54) APPARATUS, SYSTEM, AND METHOD FOR FACILITATING PRODUCT WEIGHT IDENTIFICATION IN A CHECKOUT LANE

(75) Inventors: Scott Wesley Dickover, Jacksonville, FL (US); Wesley D. Dickover, Stuart, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/920,804

(22) Filed: Aug. 18, 2004

(65) Prior Publication Data

US 2006/0038007 A1    Feb. 23, 2006

(51) Int. Cl.
G06K 15/00    (2006.01)
(52) U.S. Cl. ..................................... 235/383
(58) Field of Classification Search ............... 235/383; 248/97, 100; 194/209
See application file for complete search history.

(56) References Cited

U.S. PATENT DOCUMENTS

| | | | | |
|---|---|---|---|---|
| 4,062,170 A | | 12/1977 | Orem | 53/390 |
| 4,199,122 A | | 4/1980 | Christie | 248/97 |
| D273,159 S | | 3/1984 | Adamson et al. | D6/85 |
| 4,487,388 A | | 12/1984 | Provan | 248/97 |
| 4,723,743 A | * | 2/1988 | Jenkins | 248/97 |
| 4,819,899 A | * | 4/1989 | Weil | 248/97 |
| D302,062 S | | 7/1989 | Sable | D34/5 |
| 4,869,447 A | | 9/1989 | Malik | 248/97 |
| 4,881,577 A | * | 11/1989 | Stroh et al. | 140/71 R |
| 4,981,216 A | | 1/1991 | Wilfong, Jr. | 206/554 |
| 5,125,604 A | | 6/1992 | Vrooman et al. | 248/97 |
| 5,190,253 A | | 3/1993 | Sable | 248/97 |
| 5,465,845 A | | 11/1995 | Norby et al. | 206/554 |
| 6,042,063 A | * | 3/2000 | Kerr et al. | 248/100 |
| 6,086,023 A | | 7/2000 | Kerr et al. | 248/100 |
| 6,550,583 B1 | * | 4/2003 | Brenhouse | 186/66 |
| 6,598,791 B1 | * | 7/2003 | Bellis et al. | 235/383 |

OTHER PUBLICATIONS

"IBM Self Checkout" e business on demand.

* cited by examiner

Primary Examiner—Thien M. Le
Assistant Examiner—Tae W Kim
(74) Attorney, Agent, or Firm—Kunzler&Associates

(57) ABSTRACT

An apparatus, system, and method are disclosed for facilitating product weight identification in a checkout lane. The apparatus includes an open-frame back, a pair of opposing support arms to support an open plastic bag, a pair of opposing open-frame sides, and a gate. The opposing sides are connected to the back and are positioned to define a receiving area for the plastic bag. The gate may be connected to a side or the back and retains an item placed in an open bag within the receiving area. Furthermore, guards may be mounted near the top of each side to retain handles of the bag supply within a predefined area. The apparatus may be attached to a scale associated with a self checkout lane.

21 Claims, 9 Drawing Sheets

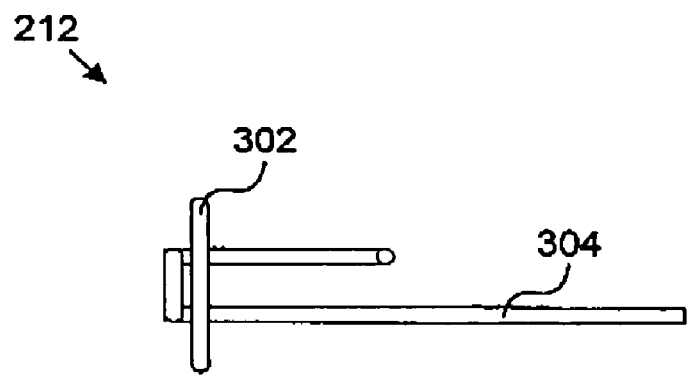
FIG. 6A
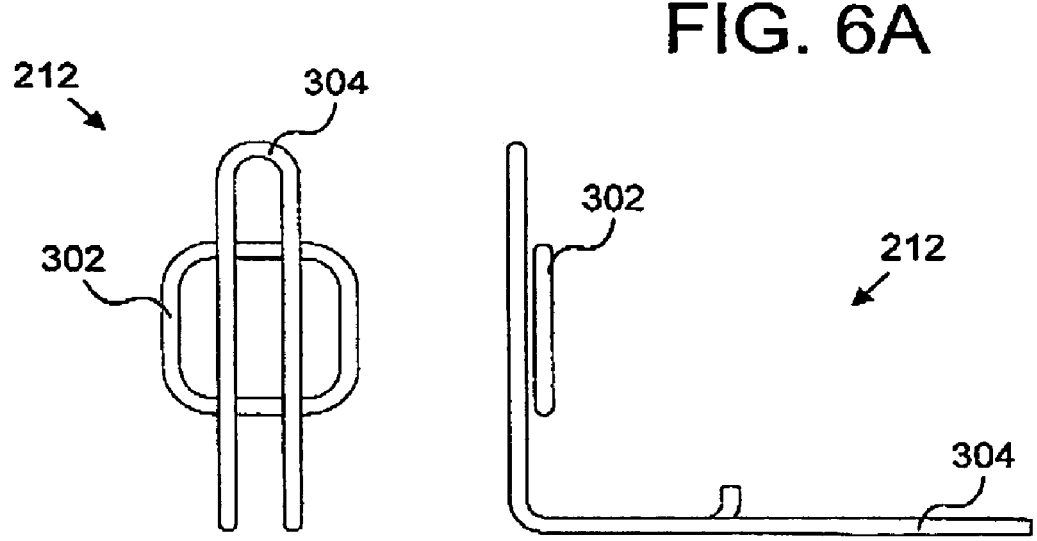
FIG. 6B
FIG. 6C
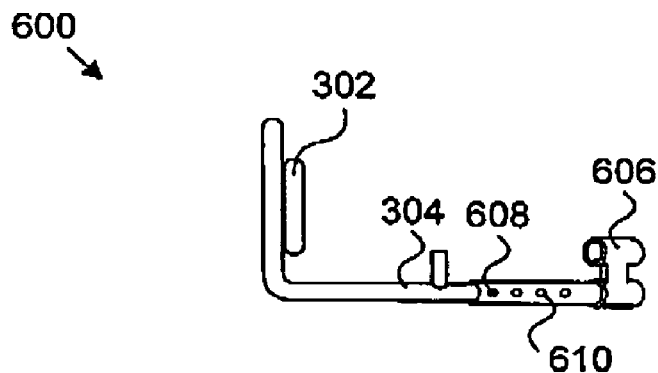
FIG. 6D

APPARATUS, SYSTEM, AND METHOD FOR FACILITATING PRODUCT WEIGHT IDENTIFICATION IN A CHECKOUT LANE

BACKGROUND OF THE INVENTION

1. Field of the Invention

This invention relates to racks that support plastic bags and more particularly relates to racks associated with weight-sensitive, self checkout lanes.

2. Description of the Related Art

Today's competitive market values efficiency. To thrive in the current market, businesses attempt to provide their customers quality service in a timely manner. One complaint customers frequently have against thriving businesses, however, concerns long lines at the checkout lanes. Customers do not want to wait to check out, especially if they are only purchasing a few items. Similarly, businesses do not want to hire too many cashiers or have too many workers standing idle. To balance the demand on the businesses and the number of available cashiers, many stores have implemented self checkout lanes that allow the purchaser to scan and bag their own items. Typically, a store assistant oversees several self checkout lanes, offering the customer guided assistance when needed.

Often, businesses have a limited floor area in which to implement self checkout lanes. As a result, manufacturers seek to minimize the size and/or footprint of the checkout lanes to correspond to the available area. Checkout lanes with a small footprint consequently enable businesses to provide multiple self checkout lanes in a small, selected area. Thus, a single store assistant is able to see and manage a large number of checkout stands at a time. Furthermore, a greater number of customers are able to take advantage of the self checkout option, which reduces the customer wait time to checkout their purchased items.

To prevent fraud, self checkout lanes typically include a product identification system to verify that the product scanned and the product bagged match a description of the product in a database. In certain self checkout lanes, the customer places scanned items in a bag supported by a bag rack attached to a scale. The scales can be extremely sensitive, capable of measuring a product within $\frac{1}{100}^{th}$ of a pound. A processor compares the weight of the scanned product against a product's weight stored in a database. If the weight measured does not correspond to the weight stored, the computer will reject the item and stop the checkout process, until either the measured weight is rectified or a store employee overrides the system. Thus, the weight-sensitive verification system prevents customers from scanning one item and bagging a different item (often more expensive than the scanned item), or bagging an item without scanning the item.

Acquiring an accurate product weight, however, can be problematic in certain instances. In smaller checkout lanes, the space surrounding the scales can be very limited. Products often lean against the walls of the scaling area, causing the scale to register an invalid weight. Also, items in a bag shift and fall, or a bag is overfilled, causing erroneous scale readings as well. Other disturbances, such as wind or interference from the handles of a bag supply against scale area walls, can also cause rejection of scanned items, thus stopping the checkout process. Consequently, the store assistant must intervene, which slows the checkout process and increases the customer wait time. Frequent stops because of registered weight differences ironically can require the store to provide additional personnel to work at the self checkout stations, which defeats certain purposes of implementing a self checkout lane.

To alleviate the problem, some product verification systems accept a scanned product weight within about a pound of the weight stored in the database (i.e., very high tolerances). This solution reduces the need for frequent customer assistance; however, the compromised verification system does not accurately determine whether the scanned item indeed matches the bagged item. Another proposed solution increases the size of the checkout lane in order to allow room for the scanned items to settle without resting against any wall surfaces. This solution nullifies the benefits of providing a checkout lane with a small footprint.

From the foregoing discussion, it should be apparent that a need exists for an apparatus, system, and method that facilitates product weight identification in a self checkout lane, particularly in a self checkout lane with a small footprint. Beneficially, such an apparatus, system, and method would retain the scanned items in a predefined area to prevent disturbances that inhibit indentification of an item. The apparatus, system, and method would allow a sensitive scale to accurately weigh and verify a scanned item. Furthermore, the apparatus, system and method would prevent environmental influences, such as air flow, from influencing scale readings.

SUMMARY OF THE INVENTION

The present invention has been developed in response to the present state of the art, and in particular, in response to the problems and needs in the art that have not yet been fully solved by currently available weight-sensitive, self checkout systems. Accordingly, the present invention has been developed to provide an apparatus, system, and method for facilitating product weight identification in a self checkout lane that overcome many or all of the above-discussed shortcomings in the art.

The apparatus to facilitate product weight identification, in one embodiment, supports an open plastic bag ready to be filled with items scanned in a checkout lane. The apparatus may include an open frame back, a pair of opposing support arms, a pair of opposing open frame sides, and a gate to retain the scanned items within a receiving area. The sides may define the receiving area for the plastic bag.

The apparatus is further configured, in one embodiment, to function in conjunction with a scale associated with a self checkout lane. The apparatus may further include a fastener connected to the bottom of a side to mount the apparatus to a scale. Items placed in the bag may be weighed on the scale to verify that the items scanned are the same items placed in the bag. The sides and the gate retain the items in the receiving area such that the items may be accurately weighed without interferences, such as items resting against nearby walls, rolling on the scale, or the like. The apparatus may further include guards to retain the handles of a bag supply within a predefined area.

In a further embodiment, the apparatus includes an attachment for facilitating product weight identification that attaches to an existing plastic bag rack. The attachment includes first and second open-frame sides that removably connect to the back of an existing plastic bag rack. A removable gate that selectively connects to the back and side may also be included. In one embodiment, the attachment also includes a guard that removably attaches to the bag rack near the top of each side. Thus, and existing bag rack may be modified to benefit from the present invention.

A system of the present invention is also presented for facilitating product weight identification in a self checkout lane. The system may be embodied in a weight-sensitive, self checkout lane. In particular, the system, in one embodiment, includes an item scanning station, an item verification station, a bagging station, and a payment station. The item verification station may include a processor and a database that stores information about product inventory. The bagging station may include a bagging apparatus of the present invention attached to a scale to obtain an accurate weight of a scanned item. The system verifies a product's identity before a customer purchases the item.

A method of the present invention is also presented for facilitating product weight identification. The method in the disclosed embodiments substantially includes the steps necessary to carry out the functions presented above with respect to the operation of the described apparatus and system. In one embodiment, the method includes providing an apparatus for supporting a plastic bag that includes an open-frame back, a pair of opposing support arms, a pair of opposing sides, and a gate. The method also may include mounting the apparatus to a scale associated with a self checkout lane, suspending a plastic bag from the support arms in an open position to receive an item, placing items in the bag, and weighing the items to verify the item identity.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A is a front view of one embodiment of a guard in accordance with the present invention;

FIG. 6B is a side view of one embodiment of a guard in accordance with the present invention;

FIG. 6C is a plan view of one embodiment of a guard in accordance with the present invention;

FIG. 6D is a plan view of one embodiment a guard with an adjustable fastener in accordance with the present invention;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
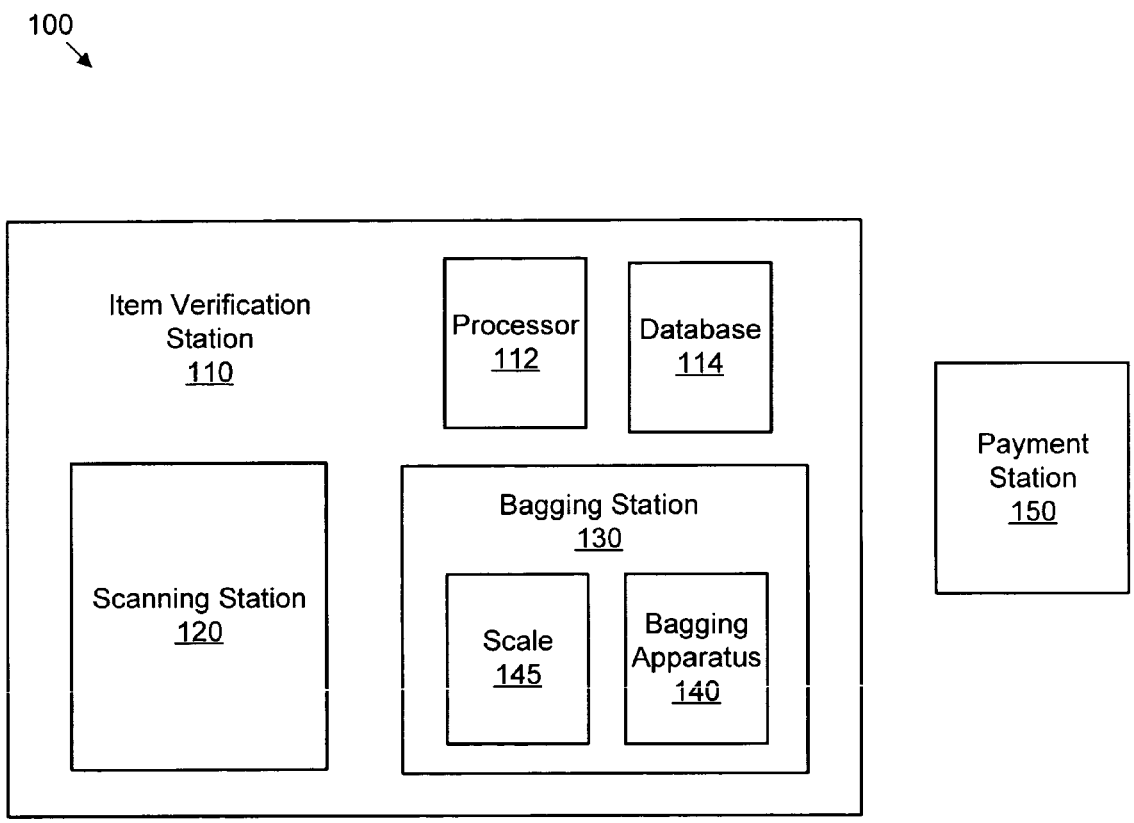
FIG. 1 is a schematic block diagram illustrating one embodiment of a system for facilitating product weight identification in a checkout lane in accordance with the present invention.

FIG. 1 depicts one embodiment of a system 100 for facilitating product weight identification in a self checkout lane. The system 100 includes an item verification station 110, a scanning station 120, a bagging station 130, a bagging apparatus 140, and a payment station 150. The system 100 preferably enables a customer to scan and bag their own items for purchase. In one embodiment, the system 100 is implemented in a self checkout lane with a small footprint to conserve space. Those of skill in the art will recognize that the system 100 of the present invention may be implemented in checkout stands of varying configurations.

In one embodiment, the item verification station 110 comprises a scanning station 120. The scanning station 120 collects input from a product to identify the item for purchase. For example, the scanning station 120 may include a scanner to scan or recognize a unique identifier, such as a UPC bar code, associated with a product. Alternatively or in addition, the scanning station 120 may include other sensors or devices, such as cameras, scales, and the like. The sensors may identify typical characteristics of an item such as size, weight, color, etc. The input received from the scanning station 120 may then be communicated to a processor 112. The processor 112 may control the checkout process.

To identify the price of a particular product, the processor 112 may compare information received from the scanning station 120 against a database 114 of inventoried items. When the processor identifies a corresponding product, the price may then be added to the user's bill. After the product is identified, the user may then bag the item at the bagging station 130.

The bagging station 130 may verify that the product bagged matches the product scanned. The bagging station 130 may comprise one or more bagging apparatus 140. The bagging apparatus 140 supports an open plastic bag and a plastic bag supply. Preferably, the apparatus 140 defines a receiving area for the plastic bag and maintains items placed in the bag within the receiving area. Features of the bagging apparatus 140 of the present invention will be discussed in greater detail with respect to FIGS. 2–8.

The bagging apparatus 140 may be mounted to a scale 145 to verify the identity of a bagged item using weight. In one embodiment, the scale 145 is configured to measure weight within $1/100^{th}$ of a pound. The weight of the bagged item measured by the scale 145 may then be compared to a typical weight stored in the database 114. If the measured weight corresponds with the stored weight, the system 100 allows the user to proceed to scan the next item, or to proceed to the payment station 150. If the measured weight differs significantly from the stored weight, the system 100 stops the checkout procedure. Action from a store employee may be required to resume the checkout process. Preferably, the system 100 reduces the need for intervention by store personnel without compromising the security and accuracy of the checkout system 100. Accordingly, the system 100 enables sensitive scales 145 to be used with the bagging apparatus 140 of the present invention to accurately identify a product.

The bagging apparatus 140 of the present invention facilitates product weight identification in a self checkout lane by reducing interferences that cause the scale 145 to inaccurately weigh a bagged item. Typical interferences include but are not limited to environmental interferences such as air flow, product interferences such as collapsing stacked items, and bagging station 130 interferences such as items leaning against the surrounding walls or structures. A defined receiving area of the bagging apparatus 140 retains the items such that the scale 145 can quickly determine an accurate weight of a bagged item.

Once the weight of the scanned item(s) and the bagged item(s) is reconciled, the system 100 permits the user to proceed to the payment station 150. The payment station 150 enables the user to exchange payment for the items scanned and bagged. In certain embodiments, the payment station 150 may be configured to accept various forms of payment and may issue change for cash purchases.

Figure 2:
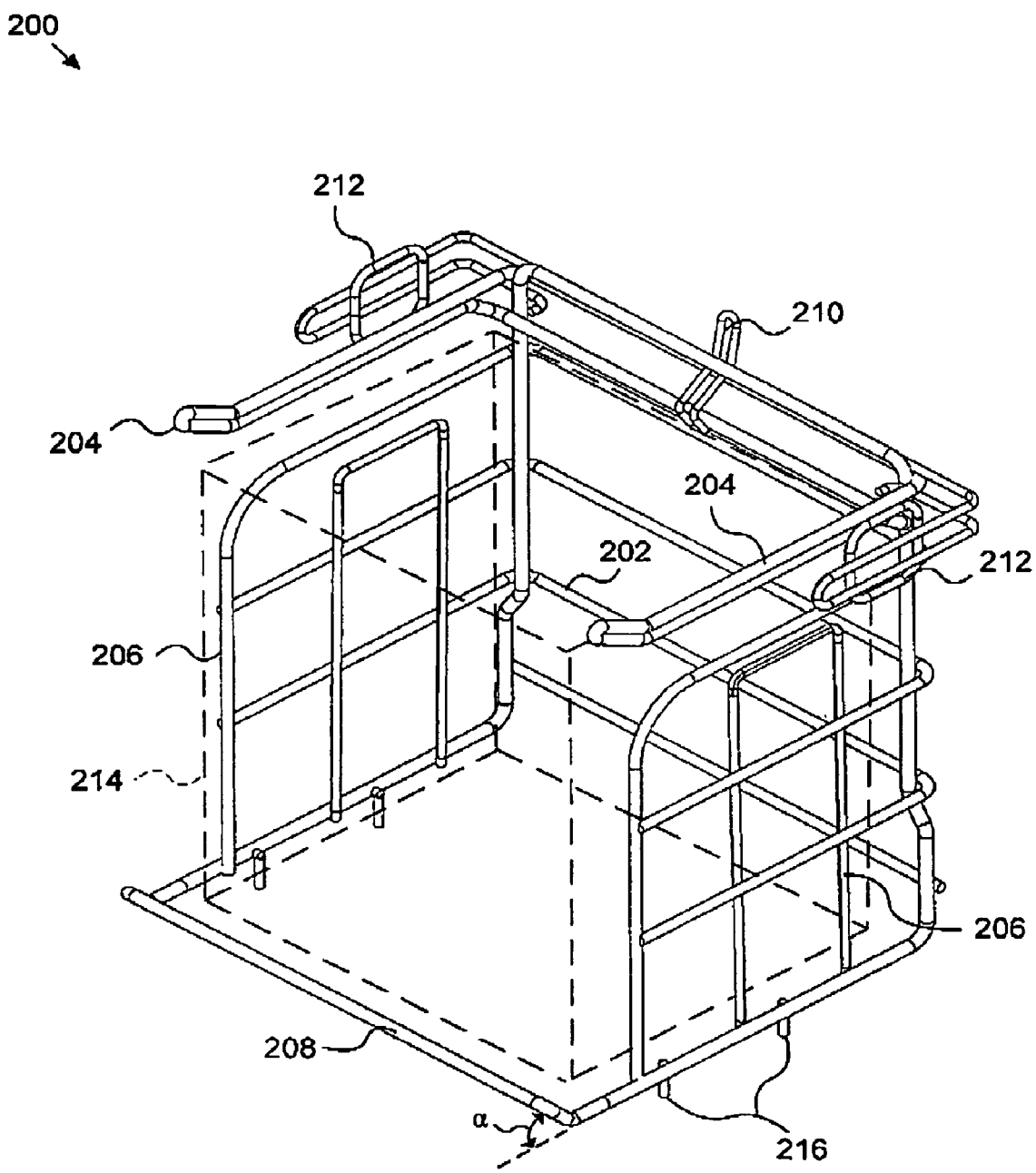
FIG. 2 is a perspective view of one embodiment of an apparatus for facilitating product weight identification in accordance with the present invention.

FIG. 2 illustrates one embodiment of a bagging apparatus 200 in accordance with the present invention. The bagging apparatus 200, as depicted, comprises an open-frame back 202, a pair of opposing support arms 204, a pair of opposing open-frame sides 206, and a gate 208. The bagging apparatus 200, in certain embodiments, may further include a protruding member 210 and guards 212. To facilitate product weight identification, the bagging apparatus 200 defines a receiving area 214 and retains scanned items within the receiving area 214.

The back 202 provides support to the bagging apparatus 200. In the depicted embodiment, the back 202 comprises wire framework that defines one boundary of the receiving area 214. In one embodiment, the framework is evenly spaced to retain relatively small items in the receiving area 214 without adding excessive weight or expense to the bagging apparatus 200. The back 202 may be sized to support an open plastic bag and a plastic bag supply (not shown), commonly known as a bag pack. To mount and support a bag pack, a protruding member 210 may be connected to the back 202.

The bag pack may also be suspended on the support arms 204. The support arms 204 may be connected to the back 202 and may extend substantially perpendicular to the back 202. Consequently, a plastic bag may be separated from a mounted bag pack and suspended from the support arms 204 in an open position to receive items. The support arms 204 position the open plastic bag in the receiving area 214. Preferably, the support arms 204 sufficiently support a plastic bag filled with various items.

In certain embodiments, the sides 206 define sides of the receiving area 214 for the plastic bag. Similar to the support arms 204, the sides 206 may be connected substantially perpendicularly to the back 202. In addition, the sides 206 may be made of open frames with a top and a bottom, though those of skill in the art will recognize that the sides 206 of the present invention may have a variety of configurations. In one embodiment, the bottom of a side 206 comprises one or more fasteners 216 configured to mount the bagging apparatus 200 to a scale 145 (FIG. 1) or other surface. Thus, the bagging apparatus 200 supports an open or filled plastic bag on a scale 145 to facilitate product verification.

The receiving area 214 formed within the structure of the back 202 and the sides 206 may span a substantially rectangular area in one embodiment. The back 202 and the sides 206 may be sized and positioned according to the size of a plastic bag. As a user fills a suspended plastic bag, the back 202 and the sides 206 limit the expandable size of the plastic bag. In addition, the back 202 and sides 206 prevent items placed in the bag from contacting structures such as the surrounding walls of the checkout stand or other bags filled with items that can cause the scale 145 to miscalculate the weight of an item placed in a bag. Retaining items in a receiving area 214 facilitates product weight identification by isolating the bagged items from outside interferences.

To further define the receiving area, the bagging apparatus 200 may include a gate 208 opposite the back 202. In certain embodiments, the gate 208 extends upwards at an angle $\alpha$ relative to a plane parallel to the bottom of the sides 206. The angle $\alpha$ helps retain items within the receiving area 214. For example, the gate 208 prevents items from rolling out of the receiving area 214 or from contacting a surface not associated with the scale 145. Preferably, the angle $\alpha$ is between about 5 degrees and about 90 degrees. In certain embodiments, the gate 208 may be connected to one or both sides 206.

To prevent hanging materials such as handles of the plastic bag or plastic bag supply from interfering with the weight verification process, the bagging apparatus 200 may comprise a pair of guards 212 to retain the material within a predefined area. A guard 212 may comprise a rectangular wire frame and may be mounted near the top of each side 206. The guard 212 is described in more detail below in relation to FIGS. 3–6.

In the depicted embodiment, the bagging apparatus 200 is made of a formed wire frame. The formed wire provides a sturdy structure, yet allows air flow to pass through the bagging apparatus 200 without affecting the scales 145 or the product verification process. In addition, the formed wire provides a smooth contact surface for the plastic bag such that thin bags may safely contact the bagging apparatus 200 without being torn.

Figure 3:
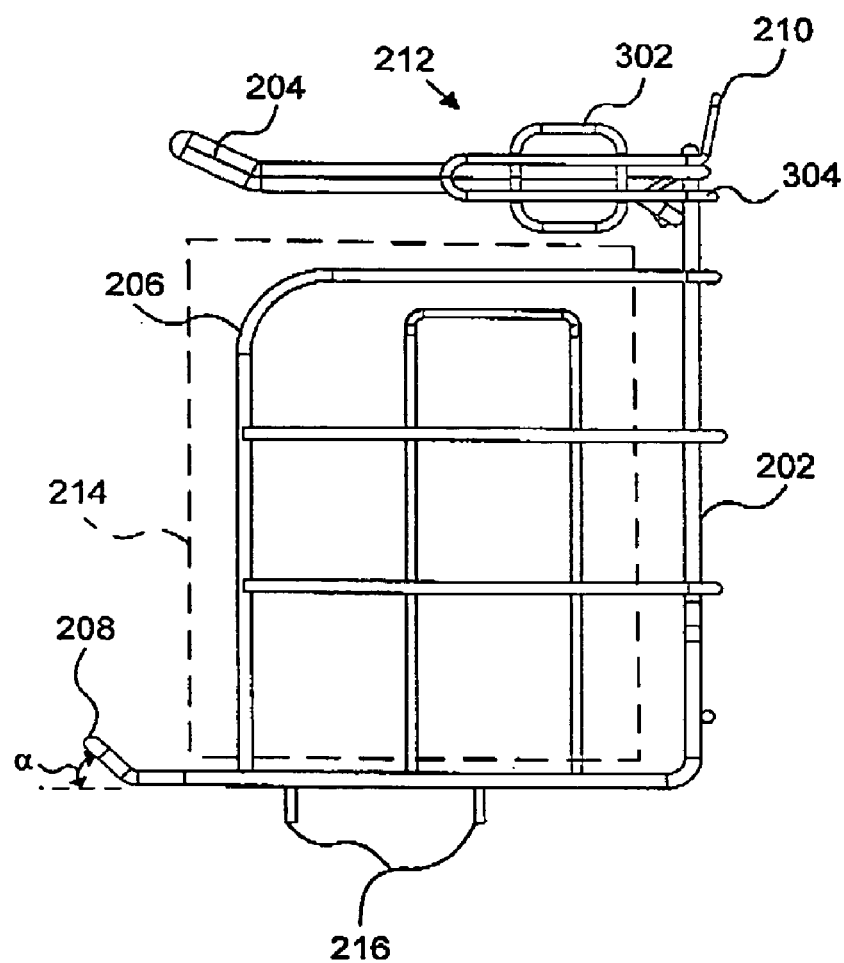
FIG. 3 is a side view of one embodiment of an apparatus for facilitating product weight identification in accordance with the present invention.

FIG. 3 illustrates a side view of the bagging apparatus 200. In the depicted embodiment, the gate 208 is angled at about 45° relative to the bottom of the side 206. The slanted gate 208 directs the items placed in a bag toward the receiving area 214. In addition, the gate 208 preferably retains items in the receiving area 214 without inhibiting the user from removing a plastic bag full of items. As shown, the gate 208 may be attached to the bottom of a side 206. Alternatively, the gate may be attached to the back 202.

In the depicted embodiment, the sides 206 define the receiving area 214. In one embodiment, the length of the sides 206 between the top and the bottom spans a substantial length of the back 202, thereby substantially enclosing three surrounding sides of the receiving area 214. In an alternative embodiment, the sides 206 span a partial length of the back 202, creating a partial barrier or guide for the items placed in a bag. In a further embodiment, each side 206 may comprise multiple, separate side portions or segments (not shown) combined to define a receiving area 214 for the bag. In the depicted embodiment, fasteners 216 connected to the bottom of the sides 206 enable the bagging apparatus 200 to be mounted to a scale 145. Those of skill in the art will recognize that various fasteners or connectors may be used to mount the bagging apparatus 200 of the present invention to a scale 145 or other surface.

Also depicted in greater detail in FIG. 3 is a side view of one embodiment of a guard 212. The guard 212 may comprise a rectangular-shaped stop 302 connected to the back 202 by way of an L-shaped arm 304. As mentioned, the guard 212 retains the hanging excess material from the plastic bag supply and handles of the plastic bag within a predefined area to prevent the material from interfering with the product verification process. Eliminating such interferences facilitates an efficient checkout process, particularly with highly sensitive scales 145.

Figure 4:
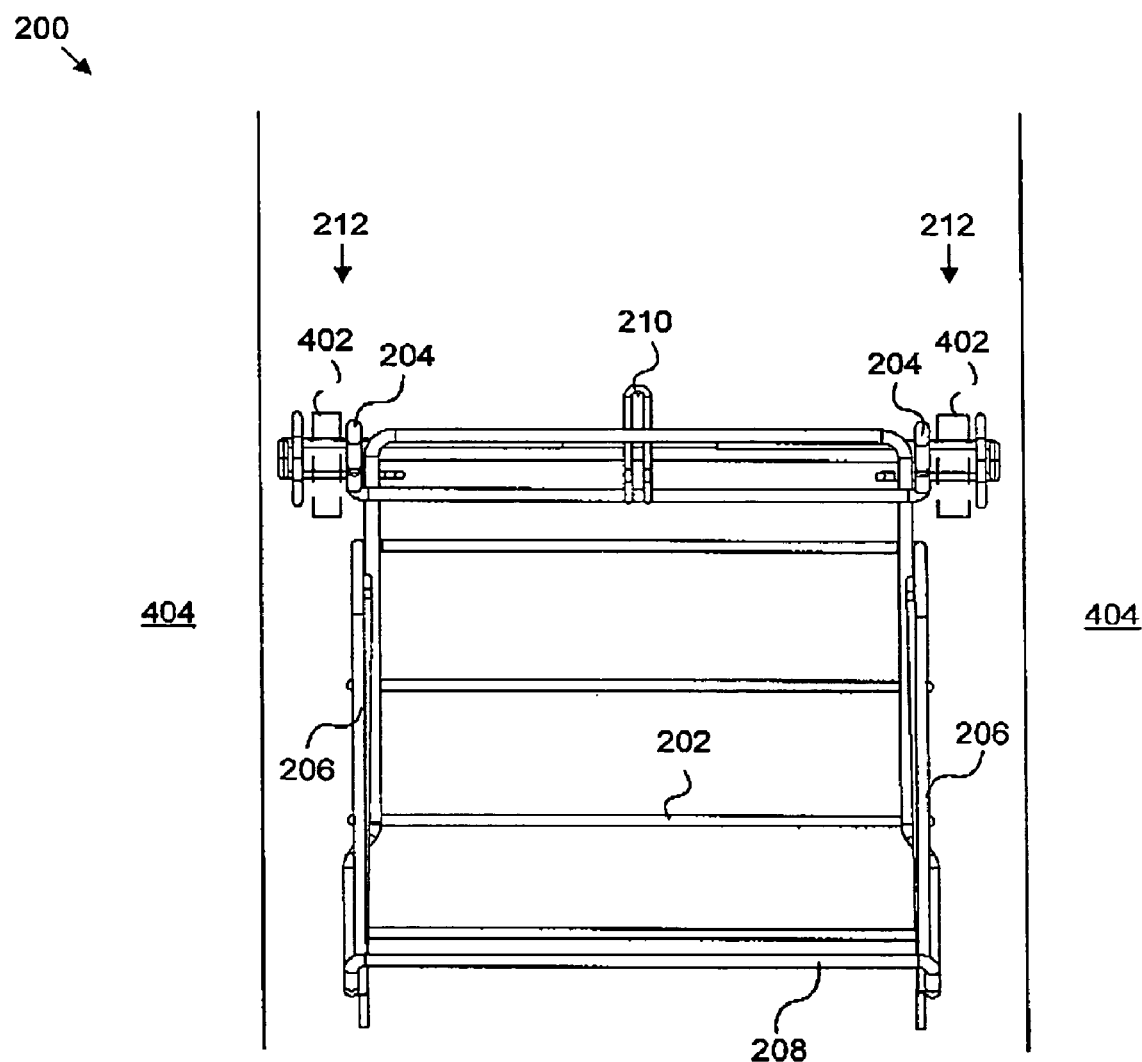
FIG. 4 is a front view of one embodiment of an apparatus for facilitating product weight identification in accordance with the present invention.

FIG. 4 illustrates in greater detail a front view of one embodiment of a bagging apparatus 200 with a retaining area 402 for retaining excess material such as the handles of the bags in the bag supply. In certain embodiments, the size of the retaining area 402 may be adjusted. For example, the guard 212 may comprise a fastener (not shown) to adjust the distance between the guard 212 and the support arm 204 and/or side 206. In addition, the guards 212 may be removably connected to the back 202.

In certain instances, the bagging apparatus 200 may be located near walls 404 or other nearby structures. As mentioned, the excess material from plastic bag handles and plastic bag supplies can contact walls 404 and hinder the weighing process. A sensitive scale 145 may be affected by the interference. To solve this problem, the guards 212 retain the material in the retaining area 402, thereby preventing the excess material from contacting the walls 404.

Figure 5:
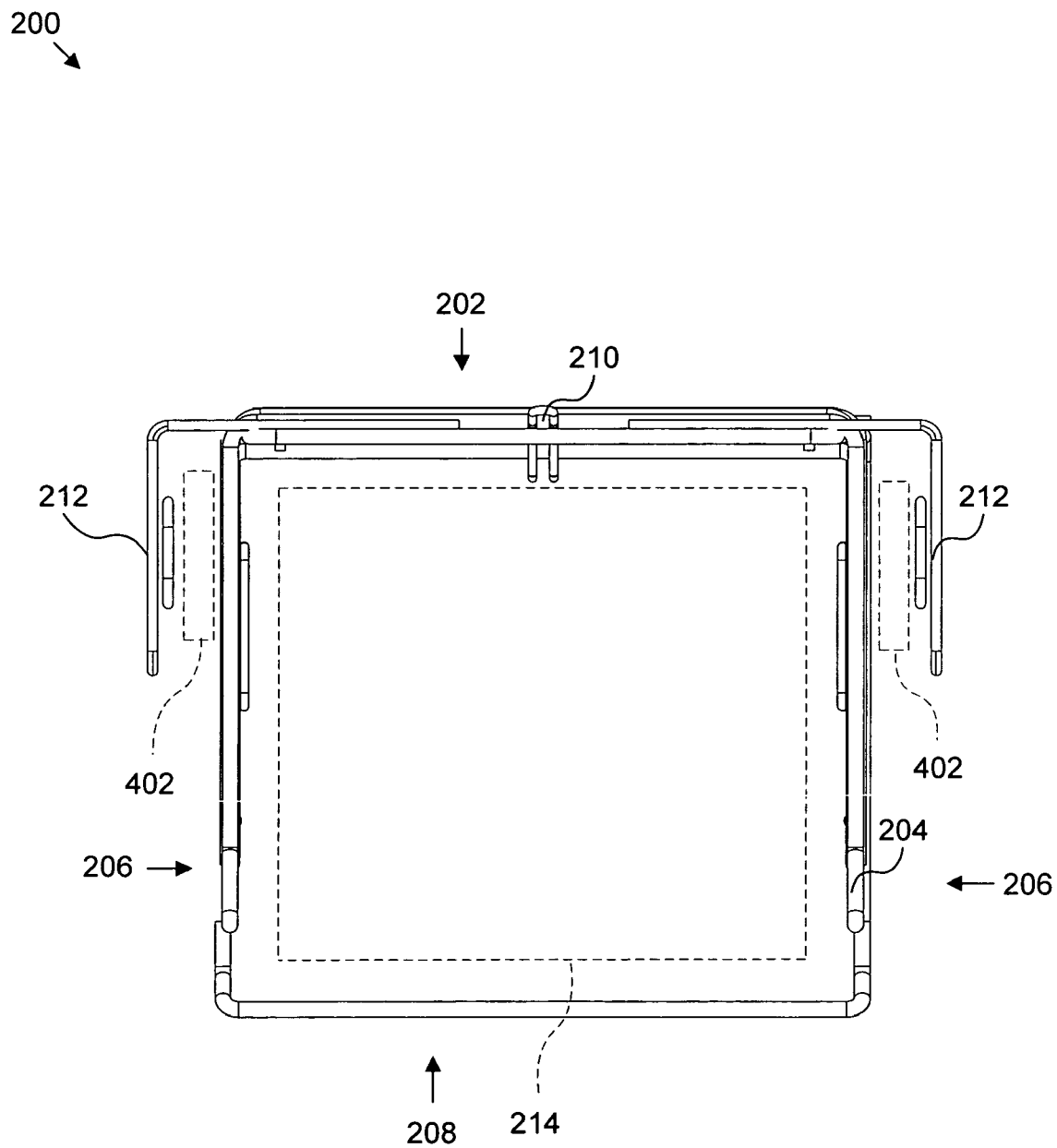
FIG. 5 is a plan view of one embodiment of an apparatus for facilitating product weight identification in accordance with the present invention.

FIG. 5 illustrates a plan view of one embodiment of a bagging apparatus 200. The back 202, sides 206, and gate 208 define the receiving area 214. When items are placed in a plastic bag suspended from the support arms 204, the items are retained within the receiving area 214. Furthermore, the handles and excess material from the plastic bag supply are retained within the retaining area 402. Consequently, the bagging apparatus 200 may be installed in a relatively confined area such as a checkout lane with a small footprint.

The receiving area 214 and retaining area 402 prevent the plastic bags and the items contained within the plastic bags from negatively influencing the weight measured by the scales in the product verification process. In certain applications, a highly sensitive scale 145 is desirable to accurately verify the weight of a product. In one embodiment, the scale 145 weighs an item within $1/100^{th}$ of a pound. The receiving area 214 and retaining area 402 keep the plastic bag from slight contact or brushing that can cause the weighing process to fail. Accurate and efficient product weight identification with a highly sensitive scale facilitates the checkout process.

FIGS. 6A, 6B, and 6C illustrate a front view, a side view, and a plan view respectfully of one embodiment of a guard 212. FIG. 6D illustrates an alternative embodiment of a removable guard 600. In one embodiment, the components of the guard 212 include a substantially L-shaped arm 304 that extends parallel to both the back 202 and a support arm 204 (FIG. 5). A rectangular stop 302 (FIG. 6B) may be connected to the arm 304. In certain embodiments, the arm 304 may be connected to the back 202 of the bagging apparatus 200 and may suspend the rectangular stop 302 at an angle substantially perpendicular to the back 202 of the bagging apparatus 200. The rectangular stop 302 retains the hanging excess materials of the plastic bag and bag supply within the retaining areas 402 (FIG. 5).

The guard 600 depicted in FIG. 6D includes a fastener 606 that removably connects the guard 600 to the back 202 of a bagging apparatus 200. In one embodiment, the guard 600 comprises an arm 304 and a rectangular stop 302. The arm 304 may include an adjustment mechanism such as a pushbutton 608 that inserts into holes 610 in the fastener 606. The adjustment mechanism enables the length of the arm 304, and consequently the size of the retaining area 402 (FIGS. 4 and 5), to be adjusted. Other types of adjustment mechanisms, such as slide adjusters and the like, may be used to adjust the distance between the rectangular stop 302 and a side 206.

Figure 7:
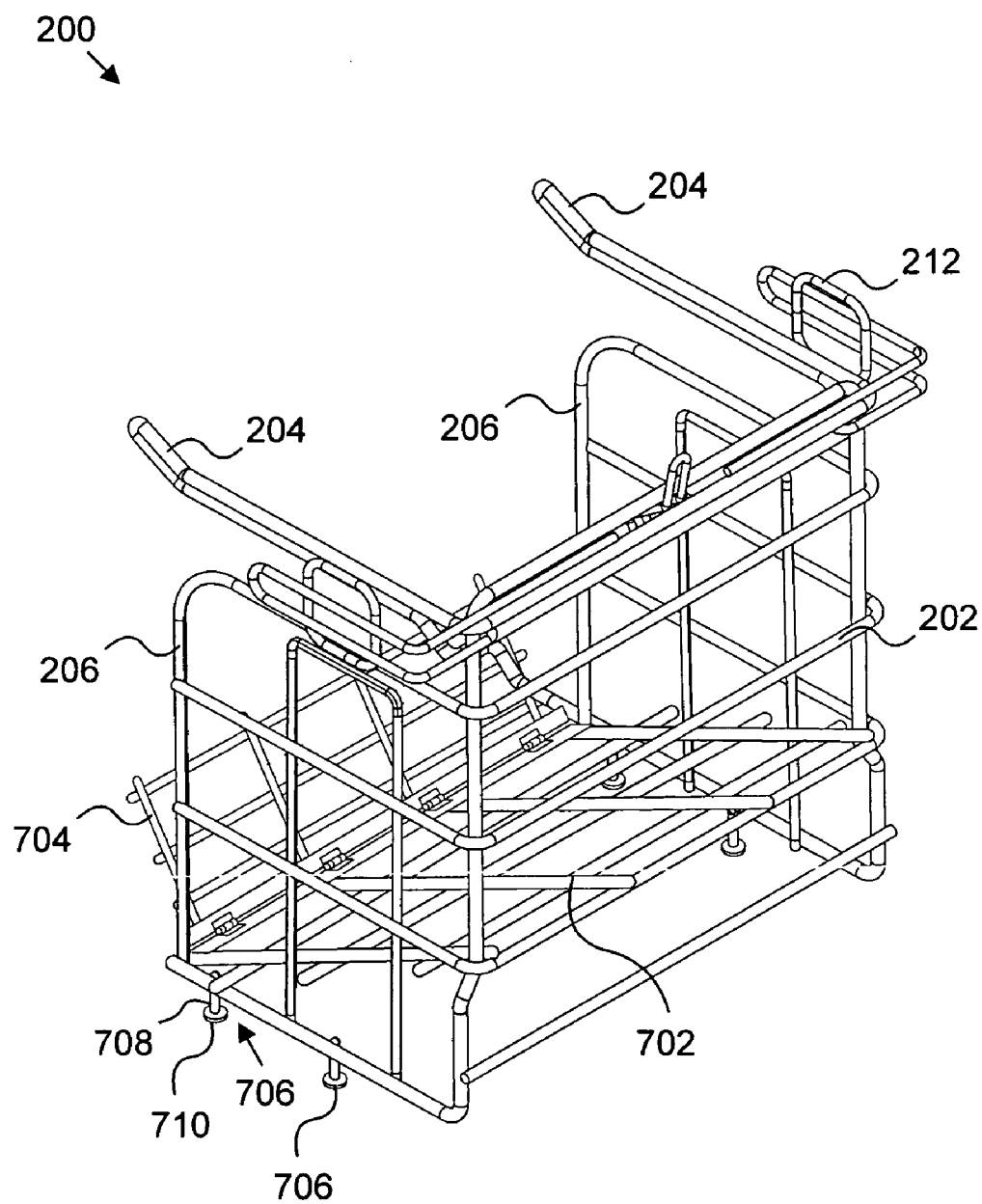
FIG. 7 is a perspective view of an alternative embodiment of an apparatus for facilitating product weight identification in accordance with the present invention.

FIG. 7 illustrates one embodiment of a bagging apparatus 200 comprising a diverter 702. The diverter 702 may be connected to the back 202 of the bagging apparatus 200 and to an extended gate 704. To facilitate product weight identification, a diverter 702 may be used to direct items placed in a bag toward the front of the receiving area 214 (FIG. 2). In certain instances, the diverter 702 may also be used as a slanted ramp to support items stacked in a bag. For example, a user may stack items against the diverter 702 such that gravity maintains the items stacked against the diverter 702. Consequently, the items retained in the receiving area 214 settle quickly to be weighed and have a lower risk of falling than unsupported stacks of items.

In certain embodiments, the gate 704 of the bagging apparatus 200 is extended and slanted to direct the items placed in a bag toward the receiving area 214. Preferably, the extended gate 704 permits filled bags to be easily removed from the bagging apparatus 200. In one embodiment, the extended gate 704 may be pivotally connected to the diverter 702 to facilitate removing a filled bag from the bagging apparatus 200. In one embodiment, a spring hinge pivotally connects the diverter 702 to the extended gate 704, thus enabling the extended gate 704 to move freely as filled bags are removed. Consequently, the user may pull the bag forward off of the support arms 204 toward the extended gate 704. The weight of the bag causes the gate 704 to extend downward, thus permitting easy passage of the filled bag. Yet the extended gate 704 returns to an upward slanted position to direct bagged items toward the receiving area 214 when a subsequent plastic bag is supported on the support arms 204.

In an alternative embodiment, an extended gate 704 may be connected to the back 202 of the bagging apparatus 200. Similar to the above mentioned embodiment, an extended gate 704 may be pivotally connected to the back 202 of a bagging apparatus 200 by a spring hinge. Thus, the extended gate 704 may be used to stack items placed in a bag, yet the bag may still be easily removed.

Additionally, FIG. 7 illustrates a bagging apparatus 200 comprising a fastener 706 having a stem 708 and a head 710 with shoulders configured to engage bulb-shaped slots in a scale 145. As a result, the bagging apparatus 200 may be easily attached to and removed from a scale 145 in a self checkout lane without requiring tools.

Figure 8:
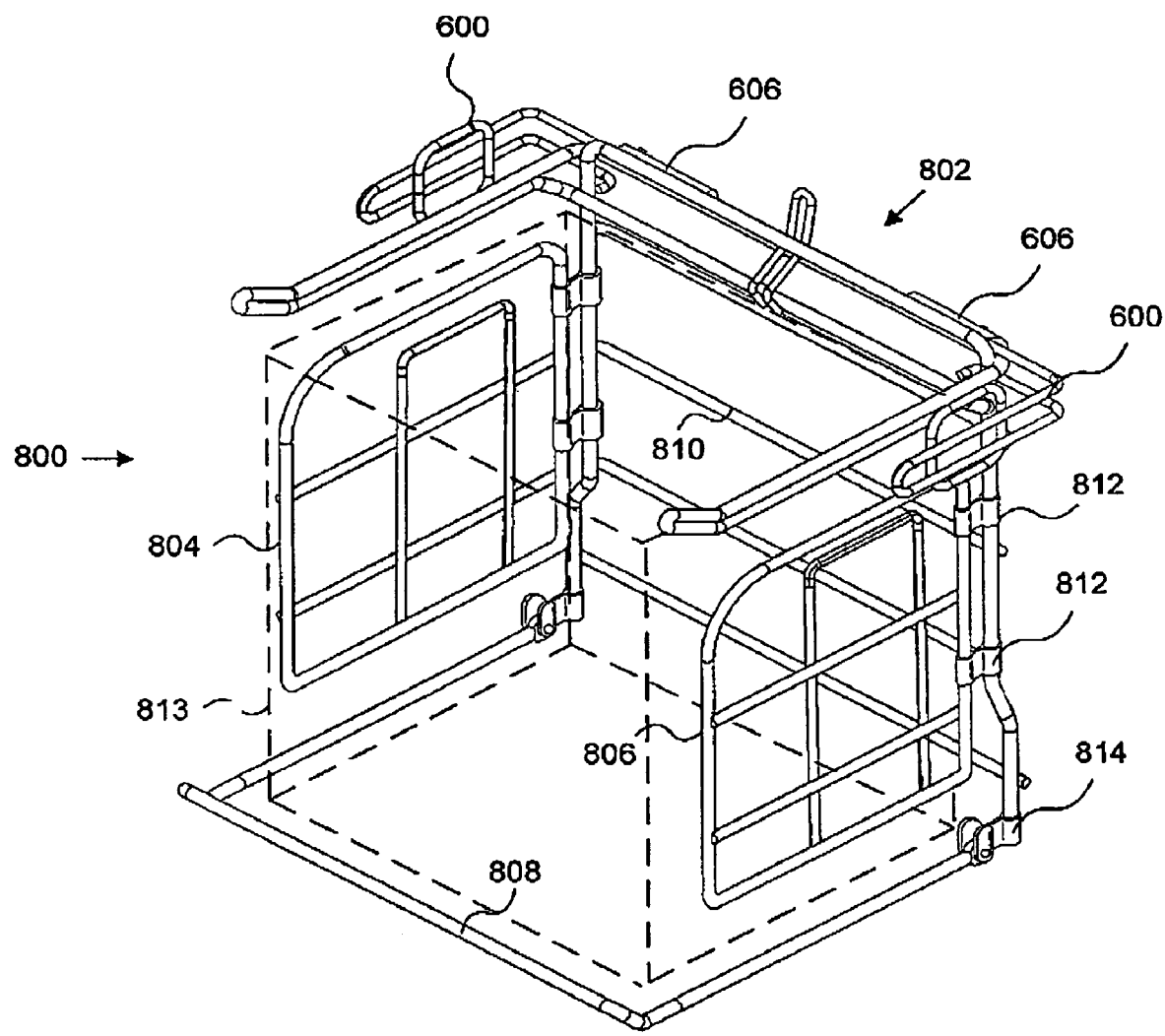
FIG. 8 is a perspective view of another embodiment of an attachment for facilitating product weight identification in accordance with the present invention.

FIG. 8 illustrates one embodiment of an attachment 800 for facilitating product weight identification in a self checkout lane. The attachment 800 may be applied to an existing plastic bag rack 802 to enhance product weight identification. The attachment 800 may include a first side 804, a second side 806, a gate 808, and guards 600.

In one embodiment, the first and second sides 804, 806 are open frames that removably connect to the back 810 of the existing bag rack 802. One or more fasteners such as grid connectors 812 may attach the open-frame sides 804, 806 to the frame of the back 810. The sides 804, 806 may be positioned to define a receiving area 813 for a plastic bag as previously discussed. In certain embodiments, the sides 804, 806 are connected substantially perpendicular to the back 810 to create a rectangular receiving area 813. In certain embodiments, to define an adequate receiving area 813, the sides 804, 806 may be L-shaped to connect to a main support of the back 810. As a result, the L-shaped sides 804, 806 define a rectangular receiving area 813 wide enough to fill a plastic bag. In one embodiment, the sides 804, 806 may include an adjustable fastener (not shown) to allow the dimensions of the receiving area 813 to be adjusted.

The gate 808 may also define the receiving area 813. In the depicted embodiment, the gate 808 includes a fastener 814 that connects the gate 808 to the back of the bag rack 802. In certain embodiments, the gate 808 may be configured to selectively connect to either the back 810 of the existing bag rack 802 or to one or both sides 806, 804. In the depicted embodiment, the fastener 816 includes a hinge to pivotally attach the gate 808 to the back 810. In an alternative embodiment, the fastener 814 may be configured to adjust the distance between the gate 808 and the back 810, thus enabling the user to select or define the size of the receiving area 813. For example, the fastener 816 may include a slide adjuster to adjust the length of a side of the gate 808. As a result, the user may choose to lengthen or shorten the side, which consequently brings the gate 808 further or closer to the back 810.

In addition, guards 600 (FIG. 6) may be removably connected near the top of each side 804, 806. In the depicted embodiment, the guards 600 are connected to the back 810 of the bag rack 802 with fasteners 606. Thus, the user may choose to attach one or more guards 600 to the bag rack 802. The user may then adjust the guard(s) 600 to define an area 402 (FIG. 5) to retain the hanging excess material from a plastic bag supply.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
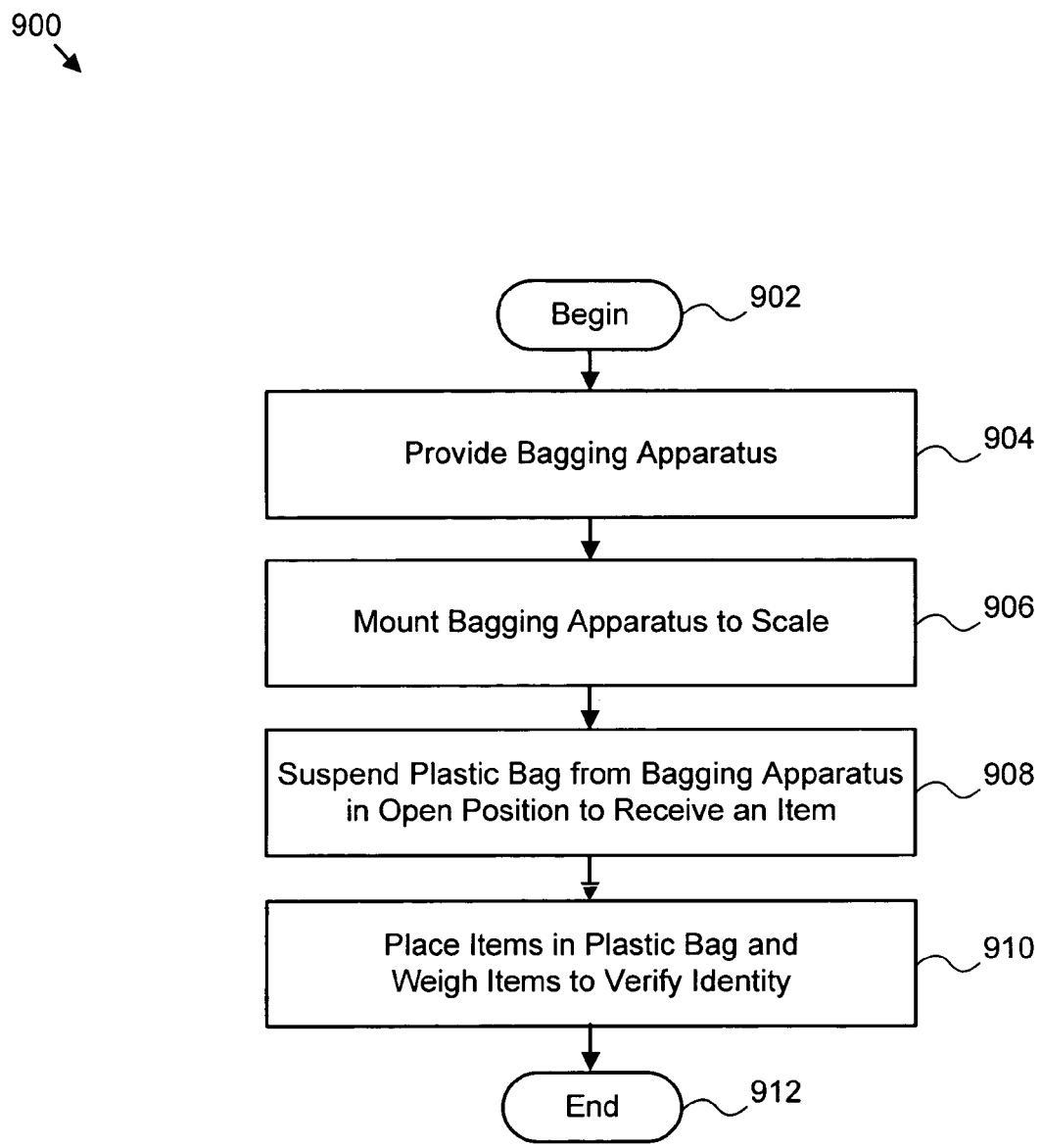
FIG. 9 is a schematic flow chart diagram illustrating one embodiment of a method for facilitating product weight identification in accordance with the present invention.

FIG. 9 illustrates a flow chart diagram of one embodiment of a method 900 for facilitating product weight identification in a self checkout lane. The method begins 902 and a bagging apparatus 140 of the present invention is provided 904. The bagging apparatus 140 preferably includes opposing support arms, opposing open-frame sides, and a gate to retain items in a defined receiving area. The bagging apparatus 140 is then mounted 906 to a scale 145. Next, a plastic bag is suspended 908 from the bagging apparatus in an open position within the receiving area. The user may then place 910 scanned items in the suspended plastic bag to be weighed, thus verifying the identity of the product. Then the method ends 912.

Thus, the user may scan an item for purchase at a self checkout lane and verify the identity of the scanned item using the method 900. The bagging apparatus 140 mounted 906 to a scale 145 enables the scanned item(s) to be retained in a receiving area defined by the sides and the gate while the items are weighed by the scale 145. The receiving area prevents items from touching the surrounding support structure of the bagging station 130. The sides and the gate of the bagging apparatus 140 help items to settle quickly and prevent items from rolling off of the weighing area. Consequently, the scale 145 may be used to obtain accurate weights to match weights stored in a database. As a result, the user may quickly scan and bag their items without the processor stopping the checkout process for an inaccurate weight due to mentioned interferences. At the same time, the store can be assured that the scanned items are indeed the items bagged and taken from the store.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for facilitating product weight identification in a checkout lane, the apparatus comprising:

an open-frame back sized to support a plastic bag and a plastic bag supply;

a pair of opposing support arms connected to the back, the support arms configured to support an open bag;

a pair of opposing open-frame sides each having a top and a bottom, the sides connected substantially perpendicular to the back and positioned to define a receiving area for the plastic bag;

a pair of guards connected to the back, the guards mounted outside the opposing support arms, parallel to the opposing support arms, and at substantially the same vertical height as the opposing support arms, wherein the guards are configured to retain handles of the bags in the bag supply within a predefined area; and a gate opposite the back and connected to at least one side, the gate configured to retain an item within the receiving area.

2. The apparatus of claim 1, wherein the guard comprises a rectangular wire frame.

3. The apparatus of claim 1, wherein the guard is removably connected to the open-frame back.

4. The apparatus of claim 1, wherein each guard comprises a fastener configured to adjust the horizontal distance that the guard extends from a side.

5. The apparatus of claim 1, wherein the back, sides, gate, and support arms comprise formed wire.

6. The apparatus of claim 1, further comprising at least one protruding member connected to the back, the protruding member configured to support the plastic bag supply.

7. The apparatus of claim 1, further comprising a fastener connected near the bottom of a side and configured to mount the apparatus to a scale.

8. The apparatus of claim 7, wherein the fastener comprises a stem and a head with shoulders configured to engage slots in the scale.

9. The apparatus of claim 7, wherein the scale is configured to measure weight within $\frac{1}{100}$ of a pound.

10. The apparatus of claim 1, wherein the length of the sides between the top and the bottom spans a substantial length of the back.

11. The apparatus of claim 1, wherein each side comprises a fastener configured to removably connect the side to the back.

12. The apparatus of claim 1, wherein the gate is slanted to direct items placed in a bag toward the receiving area.

13. The apparatus of claim 1, further comprising a diverter connected to the back and the gate, the diverter configured to direct items placed in a bag toward the receiving area.

14. The apparatus of claim 13, wherein the gate is pivotally connected to the diverter.

15. The apparatus of claim 14, further comprising a spring hinge pivotally connecting the diverter and the gate.

16. An apparatus for supporting a plastic bag, the apparatus comprising:
    an open-frame back sized to support a plastic bag and a plastic bag supply;
    a pair of opposing support arms connected to the back, the support arms configured to support an open bag;
    a pair of opposing open-frame sides each having a top and a bottom, the sides connected substantially perpendicular to the back and positioned to define a receiving area for the plastic bag;
    a pair of guards mounted outside each opposing arm and connected to the back, the guard positioned parallel to each opposing arm and at the same vertical height as each opposing arm, wherein the guards are configured to retain handles of the bags in the bag supply within a predefined area; and
    a gate opposite the back and connected to the back, the gate configured to retain an item within the receiving area.

17. The apparatus of claim 16, wherein the gate is configured to pivotally connect to the back.

18. The apparatus of claim 16, wherein the gate is extended and slanted to direct the items placed in a bag toward a receiving area.

19. A system for facilitating product weight identification in a checkout lane, the system comprising:
    an item scanning station configured to identify an item for purchase;
    an item verification station configured to verify physical properties of an item for purchase, the item verification station including a scale;
    a bagging station coupled with the item verification station and configured to facilitate product weight identification by way of a bagging apparatus comprising;
        an open-frame back sized to support a plastic bag supply;
        a pair of opposing support arms connected to the back, the support arms configured to support an open bag;
        a pair of opposing open-frame sides each having a top and a bottom connected substantially perpendicular to the back, the sides positioned to define a receiving area for the bag;
        a pair of guards connected to the back, the guards mounted outside the opposing support arms, parallel to the opposing support arms, and at the same vertical height as the opposing support arms, wherein the guards are configured to retain handles of the bags in the bag supply within a predefined area and wherein each guard comprises a fastener configured to adjust the horizontal distance that the guard extends from a side; and
        a gate opposite the back and connected to at least one side near the bottom of the side, the gate configured to retain at least one item for purchase within the receiving area; and
    a payment station configured to exchange payment for the at least one item.

20. The system of claim 19, the bagging apparatus further comprising a fastener connected to the bottom of a side and configured to mount the apparatus to a scale.

21. A method for facilitating product weight identification in a checkout lane, the method comprising:
    providing an apparatus for supporting a plastic bag, the apparatus comprising;
        an open-frame back sized to support a plastic bag supply;
        a pair of opposing support arms connected to the back, the support arms configured to support an open bag;
        a pair of opposing open-frame sides each having a top and a bottom connected substantially perpendicular to the back, the sides positioned to define a receiving area for the bag;
        a pair of guards connected to the back, the guards mounted outside the opposing support arms, parallel to the opposing support arms, and at the same vertical height as the opposing support arms, wherein the guards are configured to retain handles of the bags in the bag supply within a predefined area; and
        a gate opposite the back and connected to at least one side near the bottom of the side, the gate configured to retain an item within the receiving area;
    mounting the apparatus for supporting a plastic bag to a scale associated with a checkout lane;
    suspending a plastic bag from the support arms in an open position to receive an item; and
    placing items in the bag and weighing the items to verify item identity.

* * * * *

UNITED STATES PATENT AND TRADEMARK OFFICE
CERTIFICATE OF CORRECTION

| | |
|---|---|
| PATENT NO. | : 7,066,389 B2 |
| APPLICATION NO. | : 10/920804 |
| DATED | : June 27, 2006 |
| INVENTOR(S) | : Dickover et al. |

Page 1 of 1

It is certified that error appears in the above-identified patent and that said Letters Patent is hereby corrected as shown below:

<u>Column 2</u>

Line 66, "Thus, and existing" should read --Thus, an existing--.

<u>Column 9</u>

Line 47, "816" should read --814--.

<u>Column 11</u>

Line 55, "the guard positioned" should read --the guards positioned--.

Signed and Sealed this

Fourteenth Day of November, 2006

JON W. DUDAS
*Director of the United States Patent and Trademark Office*